(12) United States Patent
Aymard et al.

(10) Patent No.: US 6,711,533 B1
(45) Date of Patent: Mar. 23, 2004

(54) METHOD FOR CONTROLLING A DOUBLE-RESONANCE GENERATOR

(75) Inventors: Nicolas Aymard, Puteaux (FR); Jérôme Boichot, Versailles (FR); Emmanuel Godoy, Verrieres le Buisson (FR)

(73) Assignee: GE Medical Systems, SA, Buc (FR)

( * ) Notice: Subject to any disclaimer, the term of this patent is extended or adjusted under 35 U.S.C. 154(b) by 0 days.

(21) Appl. No.: 09/503,026

(22) Filed: Feb. 14, 2000

(30) Foreign Application Priority Data

Feb. 19, 1999 (FR) ............................................. 99 02116

(51) Int. Cl.⁷ ................................................. G06G 7/62
(52) U.S. Cl. ............................. 703/13; 703/18; 703/19; 363/17
(58) Field of Search ............................. 703/13, 18, 19; 363/17

(56) References Cited

U.S. PATENT DOCUMENTS

| | | | | |
|---|---|---|---|---|
| 3,748,556 A | * | 7/1973 | Gillett | 363/34 |
| 4,251,736 A | * | 2/1981 | Coleman | 307/46 |
| 4,868,728 A | * | 9/1989 | Nuns | 363/17 |
| 5,032,972 A | * | 7/1991 | Erckert | 363/17 |
| 5,267,138 A | * | 11/1993 | Shores | 363/98 |
| 5,504,668 A | * | 4/1996 | Beyerlein et al. | 363/95 |
| 5,642,268 A | * | 6/1997 | Pratt et al. | 363/17 |
| 5,684,678 A | * | 11/1997 | Barrett | 363/17 |
| 6,215,675 B1 | * | 4/2001 | Laeuffer et al. | 363/17 |
| 6,324,080 B1 | * | 11/2001 | Laeuffer | 363/25 |

FOREIGN PATENT DOCUMENTS

| EP | 0902528 | | 3/1999 | |
|---|---|---|---|---|
| FR | WO 81/01920 | * | 7/1981 | H02P/7/62 |
| JP | 2000243594 A | * | 9/2000 | H05G/1/20 |

OTHER PUBLICATIONS

"Cryogenic Semiconductor–Switched Thyratron Inverter Switches for Superconducting Inductive Energy Storage Systems" R.A Petr, IEEE CH2781–3/89/0000–0541, 1989.*
Laeuffer, J et al: "A Control Anaysis and Closed–Loop Design for a Series–Parallel Resonant Converters", EDE '97 European Conf, on Power Electronics and Applications, Sep. 8–10, 1997, VOL 4, No. 7, pp. 4379–4384.

* cited by examiner

Primary Examiner—Kevin J. Teska
Assistant Examiner—Fred Ferris
(74) Attorney, Agent, or Firm—Jay L. Chaskin; Cantor Colburn LLP

(57) ABSTRACT

The delay time control entails a static term and a corrective term and a current sampling time, the control calculated at the preceding sampling time is applied and the control intended to be applied at the following sampling time is determined. The determination of the following control is made from the working point of the generator, estimated at the following time.

6 Claims, 2 Drawing Sheets

METHOD FOR CONTROLLING A DOUBLE-RESONANCE GENERATOR

CROSS REFERENCE TO RELATED APPLICATIONS

This application claims the benefit of a priority under 35 USC 119(a)–(d) to French Patent Application No. 99 02116 filed Feb. 15, 1999, the entire contents of which are hereby incorporated by reference.

BACKGROUND OF THE INVENTION

The invention concerns double-resonance generators, intended in particular for but not limited to powering an X-ray tube.

An X-ray tube mounted, for example, in a medical radiography apparatus, comprises a cathode and an anode, both contained within a vacuum-tight casing, so as to form an electric insulation between those two electrodes. The cathode produces an electron beam which is received by the anode on a small surface constituting a focal area from which the X-rays are emitted.

On the application of a high voltage by a generator to the terminals of the cathode and anode, a so-called anode current is established in the circuit through the generator producing the high voltage. The anode current crosses the space between the cathode and the anode in the form of the electron beam which bombards the focal area.

The characteristics of the X-rays emitted by the tube, notably, their hardness, depend on numerous parameters, among which is the high voltage value applied to the electrodes. The high voltage has to be adjustable in order to obtain the characteristics sought and must remain constant throughout the time of radiological exposure, in order not to modify the operating characteristics of an X-ray receiver which receives the X-rays having crossed the object under examination.

The X-ray tubes for medical diagnosis operate by pulses. It is therefore important for the time of establishment of the high voltage as well as the time of return of that high voltage to a zero value to be as short as possible.

An X-ray tube high voltage generator comprises a thyratron inverter receiving a direct-current voltage at its terminals. This thyratron inverter is of the type containing a transistor half-bridge, each arm of the half-bridge comprising a switch containing a transistor and an antiparallel-mounted recovery diode. The signal delivered on output of the switch is filtered by a double-resonance circuit. The filtered signal is applied to the primary of a step-up transformer. The secondary of the step-up transformer is connected to a rectifying and filtering circuit comprising at least one diode half-bridge and voltage filtering capacitors.

The principle of the double-resonance converter resides in the topography of its resonant circuit. It comprises an inductance coil Lr connected in series with a capacitor Cr in parallel with an inductance coil Lp. This configuration gives the system a resonant frequency and an antiresonant frequency. The former originates from the series inductance coil Lr and capacitor Cr, and the latter originates from the parallel inductance coil Lp and capacitor Cr.

The conduction delay can be regulated and, therefore, so can the frequency of use of the transistors of each of the switches. This frequency is in relation to that of the resonant circuit defined above. The normal operating zone of the generator lies between the two natural frequencies of that circuit. The antiresonant frequency makes it possible to attain low powers and the resonant frequency makes it possible to attain high powers.

In other words, the control variable of the generator here is the delay Td for starting of the transistors from the moment of passage of the current of the thyratron inverter to zero value. One then speaks of a delay time control. More precisely, the control employs a sampling of quantities at moments defined by passage to zero of the current crossing the series inductance coil of the resonant circuit following conduction of the transistor of a switch.

It therefore appears that the power transmitted to the X-ray tube can be controlled by the operating frequency of the thyratron inverter and, consequently, by the delay for starting Td.

However, the known control circuits make it possible to establish the direct-current voltage supplying the X-ray, tube at its desired value only after too long a time, which is manifested by a loss of tinen and, by an X-ray dose unnecessarily received by the patient.

Furthermore, these control circuits leave a ripple present in the supply voltage of the tube after its establishment. The ripple is at a frequency of 100 or 300 Hz depending on the single-phase or three-phase supply tube used. These ripples are all the more disturbing as X-raying can attain thirty images per second, and that is manifested by image instability.

BRIEF DESCRIPTION OF THE INVENTION

The present invention is therefore intended to remedy the problems mentioned above by proposing a generator control making it possible to reduce substantially the time of establishment of the direct-current voltage supplying the tube at the start of X-raying.

The invention is also intended to reduce the ripples of the continuous rated voltage supplying the tube.

An embodiment of the invention therefore proposes a method of control of a double-resonance generator delivering a direct-current output voltage supplying a load, for example, an X-ray tube, in which an output current circulates, the method involving a delay time control of the transistors of the thyratron inverter of the generator.

According to a general characteristic of the invention, the control involves a static term and a corrective term. A first table (range of identification of the generator) is elaborated, containing for predetermined couples of voltage and output current values the corresponding values for the static term. A second table is also elaborated, containing corresponding desired values for a voltage at the terminals of the resonant circuit capacitor (called "first voltage"), as well as for the current crossing the inductance coil connected in parallel on said capacitor. The second table also contains corresponding gain values. Furthermore at a current sampling time, the control calculated at the preceding sampling time is applied, and the control intended to be applied at the following sampling time is determined. In addition, the static term of the following control is determined from the first table and from the voltage and output current values estimated at the following sampling time. The corrective term of the following control is determined from the second table, from the voltage and output current values, from the first voltage and from the the inductance current, all of those values being determined at the current sampling time, as well as from the value of the corrective term calculated at the preceding sampling time.

According to an embodiment of the method, the voltage and output current values are estimated at the following sampling time from a predetermined evolution of a desired output voltage. Determination of the corrective term of the following control involves measurement of the current value of the output voltage, of the current value of the first voltage and of the current value of the inductance current. This determination also involves calculation of the sum of the products of the respective differences between those measured current values and the corresponding desired values by the associated gains, the sum being increased by the product of the preceding corrective term by the associated gain.

Determination of the corrective term of the following control further advantageously entails addition of the product of an integral corrective element relative to the output voltage by the associated gain. This advantageously makes it possible to catch model errors.

According to an embodiment of the invention, the elaboration of the first table as well as the elaboration of the desired values for the first voltage and inductance current is obtained by simulation from a generator representation circuit, in which simulation of the desired values are obtained in steady state by using only one transistor of the thyratron inverter and by inverting, at the beginning of each cycle, the variables belonging to the common part of the representation circuit. Furthermore, elaboration of the gains entails the elaboration of a dynamic model, the coefficients of which are obtained by variations of the initial conditions.

DETAILED DESCRIPTION OF THE INVENTION

Figure 1:
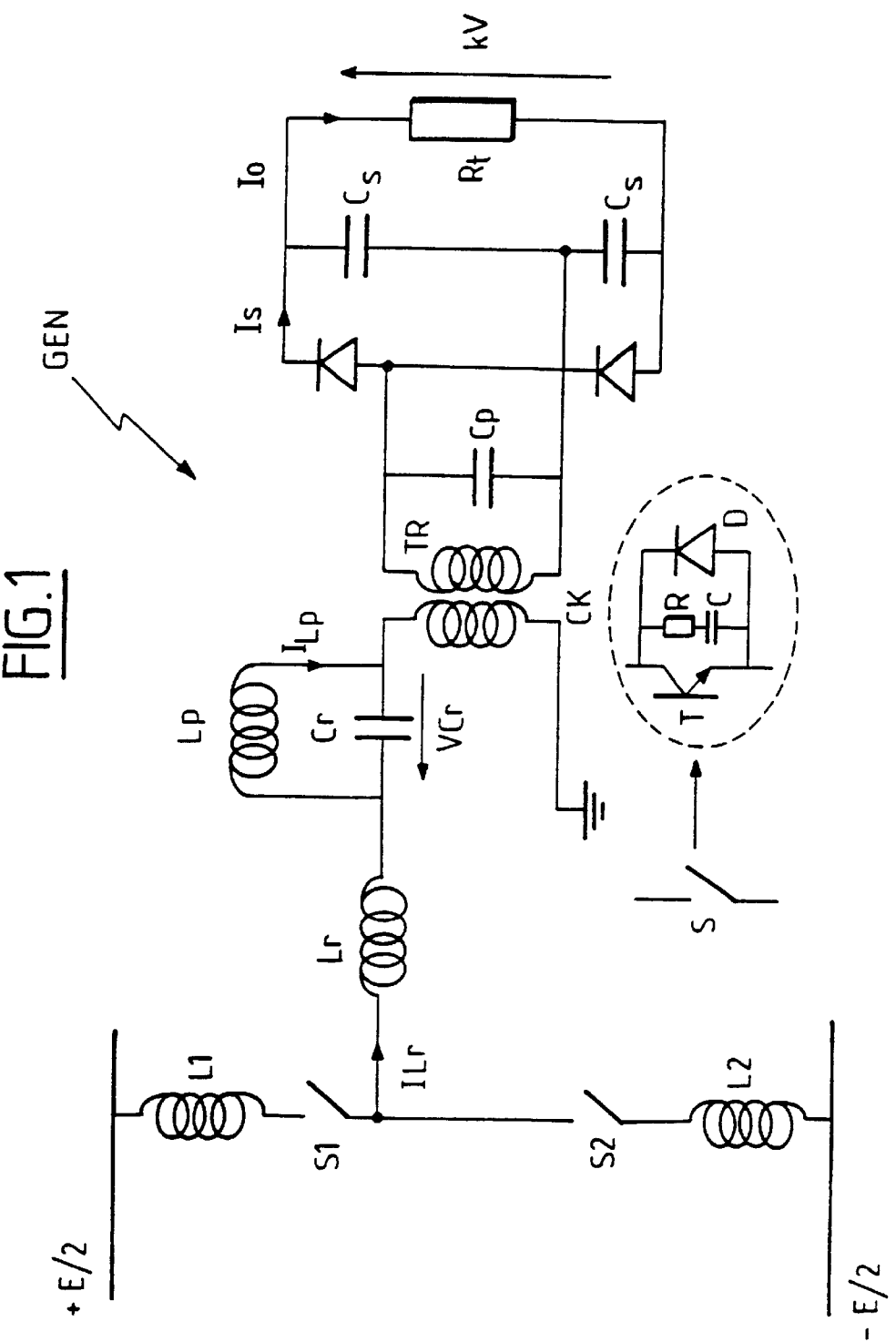
FIG. 1 is an electric representation circuit of a double resonance generator.

As can be seen in FIG. 1, a direct-current voltage source supplies a half-bridge equipped with two switches S1 and S2, each comprising a power transistor, for example, of the insulated grid bipolar transistor (IGBT) type and of a recovery diode D. Inductance coils L1 and L2 serve to aid switching. Voltage E is furnished by the alternating-current voltage of the network, which is rectified by means not represented.

The output from the middle of the half-bridge formed by the switches S1 and S2 are connected to a terminal of the primary of a transformer TR. A resonant circuit (double-resonance filter) is placed between the point common to the two switches S1 and S2 and the transformer TR. The resonant circuit contains a series inductance coil Lr, a series capacitor Cr and a parallel inductance coil Lp connected in parallel on the capacitor Cr. The transformer Tr boosts the voltage by a coefficient CK. The voltage is then rectified by a diode half-bridge and by two filter capacitors $C_s$.

Figure 2:
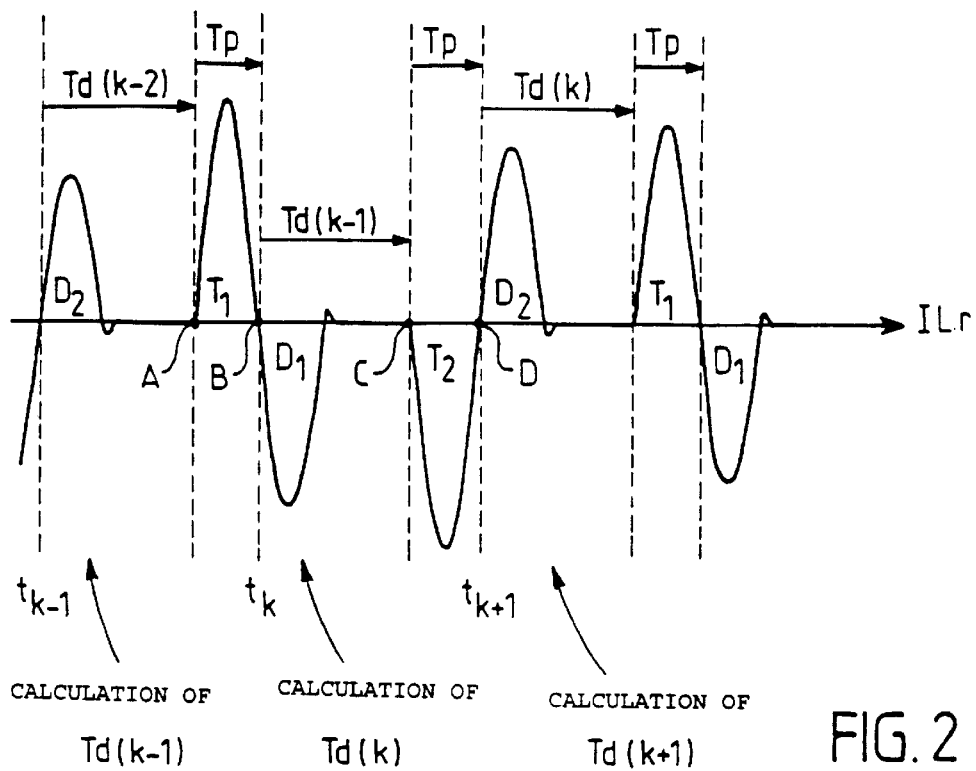
FIG. 2 illustrates a variation of the current ILr on a delay time control according to an embodiment of the invention.

As illustrated, in particular, in FIG. 2, the generator control employs a sampling of the quantities at times $t_k$ defined by the passage to zero of the current ILr crossing the series inductance coil Lr following the conduction of one of the transistors of the corresponding switch. The control value associated with that sampling is time, called delay time Td, separating the current sampling time from the next conduction of one of the transistors. The following sampling time will be taken on zero passage of the current ILr on the descending back, in case switch T1 is conductive, and on the rising front, in case switch T2 is conductive.

The two switches S1 and S2 are alternately tripped. In other words, if, for example, S1 is tripped in the course of cycle k, then T2(S2) will be tripped in the course of cycle k+1, and so on.

It is to be noted that this switching sequence is illustrated in FIG. 2 in the case of a discontinuous conduction. This type of conduction occurs when the control value Td is greater than the conduction time of the diodes. Of course, the invention also applies in the case of continuous conduction, which occurs when the delay time Td is less than the conduction time of the diodes on discontinuous rating.

More precisely, in FIG. 2, at sampling time $t_{k-1}$ transistor T2 conducts and diode D2 is passing. Delay time Td(k−2) is then applied, calculated at the preceding sampling time. More precisely, when the time Td(k−2) has elapsed, the switch S1 is closed, that is, transistor T1 is rendered conductive. Zero passage of the current ILr after making transistor T1 conductive is carried out, in the case of FIG. 2, at the end of a predefined time Tp generally in the order of 6 to 6.5 $\mu$s. The instant of zero passage of the current Ilr defines the sampling time $t_k$.

Furthermore, at sampling time $t_{k-1}$, the delay time Td(k−1) to be applied at the following sampling time $t_k$ is calculated.

At the end of time Td(k−1), the transistor T2 is rendered passing during time Tp and zero passage of the current ILr then defines the following sampling time $t_{k+1}$, from which the delay time Td(k) calculated in the previous cycle will be applied.

The control Td(k) involves a static term Td0(k) and a corrective term $\Delta$Td(k) and is defined by formula (1):

$$Td(k)=Td0(k)+\Delta Td(k) \quad (1)$$

In this formula (1), the corrective term $\Delta$Td(k) is defined by formula (2):

$$\Delta Td(k)=K_{kV}(k)(kV_{mes}(k)-kV_{cons}(k))+K_{ILp}(k)(ILp_{mes}(k)-ILp0(k))$$
$$+K_{Vcr}(k)(Vcr_{mes}(k)-Vcr0(k))+Krr(k)\cdot IT(k)$$
$$+K_{\Delta Td}(k)\cdot \Delta Td(k-1)$$

Formula (2) above uses five variables, namely, the output voltage kV, a first voltage Vcr at the terminals of the capacitor Cr of the resonant circuit, the current ILp crossing the inductance coil Lp of the resonant circuit, a corrective integral term IT and the corrective term $\Delta$Td, taken at the preceding sampling time.

In formula (2), the values $kV_{cons}$, ILp0 and Vcr0 designate the desired values that are valid at sampling time k for the corresponding variables. The time curve defining $kV_{cons}$ as a function of time, for each sampling time k, is a predetermined function of time depending on the size of the generator. By way of indication, the desired curve of the output voltage can be formed by a slope of 100 kV/ms followed by a plateau at a value ranging between 40 and 150 kV.

The desired values ILp0 and Vcr0 result, as can be seen in greater detail below, from a simulation of the generator from a representation circuit of the latter, in which the desired values are obtained in steady state by using only one transistor of the thyratron inverter and inverting the variables belonging to the common part of the representation circuit.

In formula (2), $K_{kV}(k)$, $K_{ILp}(k)$, $K_{Vcr}(k)$, $K_{IT}(k)$ and $K_{\Delta Td}$ designate gain values at time k, associated with the different state variables.

The way in which these gains are calculated will be reviewed in greater detail below.

Finally, in formula (2), $kV_{mes}(k)$, $ILp_{mes}(k)$ and $Vcr_{mes}(k)$ designate the values measured at time k of the corresponding variables.

The integral term IT(k) is defined by formula (3) and the corrective term $\Delta Td(k-1)$ is defined by formula (4).

$$IT(k)=IT(k-1)-kV(k) \quad (3)$$

$$\Delta Td(k-1)=Td(k-1)-Td0(k-1) \quad (4)$$

The integral term IT represents the integral of the error on the output voltage.

Associated with each couple (output voltage kV; output current I0), defining a working point of the generator, there is a static term Td0, as well as a desired value ILp0 and Vcr0. The correspondence between these different values is obtained by a simulation from a representation circuit of the generator, in which simulation those values are obtained by using a single transistor of the thyratron inverter and inverting the variables belonging to the common part of the representation circuit.

Furthermore, the different gains are obtained from elaboration of a dynamic model of the generator, the coefficients of which are obtained by variations of the initial conditions.

In practice, the different values Td0, ILp0 and Vcr0 as well as the different gain values are stored in a memory of the control device. For purposes of simplification, it will be assumed here that the memory holds a first table containing, for each couple of values of voltage kV and output current I0, the corresponding value of the static term Td0, and a second table containing the corresponding desired values Ilp0 and Vcr0 as well as the corresponding gain values.

The representation circuit of the generator making simulation possible is the one illustrated in FIG. 1, in which, however, the primary of the transistor is represented by a resistor connected in series with an inductance coil connected in parallel on an ideal voltage source. In addition, the secondary of the transistor is represented by an ideal voltage source connected in series with a resistor. Likewise, the capacitors $C_s$ are replaced by ideal voltage sources.

A range of values is then defined for the output voltage, for example, from 0 to 150 kVolts, plus a range of values for the static term Td0, for example, from 0 to 20 μs. A mesh is then defined from those two ranges of values. By way of indication, 32×32 couples (output voltage; Td0) can be defined.

The simulation is then carried out as follows:

For each couple (kV; Td0), a working cycle of the generator is begun by closing, for example, switch T1 (point A in FIG. 2). The current ILr is allowed to progress up to point B. At that instant, the different values of the different variables of the circuit are evaluated; in this case, the values of current ILp, of the first voltage Vcr, of current ILm in the inductance coil of the primary of the transformer, of the voltage at the primary of the transformer, of the voltage at the secondary of the transformer, and of the voltage at the terminals of the capacitor Cp. These quantities, which belong to the common part of the representation circuit, are then inverted and those inverted values are used as initial condition for the continuation of simulation. The continuation of simulation is, notably, going to involve, at the end of time Td0, the conduction, not of the second transistor T2, but of the same transistor T1 (point C in FIG. 2). When transistor T1 again finishes conducting (point D in FIG. 2), a new evaluation is then made of the quantities of the representation circuit. Those belonging to the common part of the circuit are inverted and simulation is continued with those inverted values. When the steady state is attained, that is, when those values have all converged and the output voltage has reached the value kV fixed, the corresponding values ILp0, Vcr0, as well as the value of current I0 in the tube, are obtained for the couple (kV; Td0).

This stabilization around a working point makes it possible to memorize the quantities in steady state. This being so, it is also necessary, for each working point, to determine the associated gains. This is done by using a dynamic model, the coefficients of which are obtained by variations of the initial conditions.

More precisely, if one designates by Xe(k) the state vector at 5 variables, as defined by formula (6) below:

$$Xe(k)=[kV(k)V_{Cr}(k)I_{Lp}(k)IT(k)\Delta Td(k-1)] \quad (6)$$

the representation of state of the model is in the form:

$$Xe(k+1) = \begin{pmatrix} 1-2^*T_c/(R_t^*C_s)+f11C & f12/C & f13/C & 0 & g_1/C_s \\ f21 & f22 & f23 & 0 & g_2 \\ f31 & f32 & f33 & 0 & g_3 \\ \_1 & 0 & 0 & 1 & 0 \\ 0 & 0 & 0 & 0 & 0.001 \end{pmatrix} Xe(k) + \begin{pmatrix} 0 \\ 0 \\ 0 \\ 0 \\ 1 \end{pmatrix} \Delta Td(k) + \begin{pmatrix} W_1 \\ W_2 \\ W_3 \\ 0 \\ 0 \end{pmatrix} e(k)$$

By variation of the initial conditions and carrying out a simulation on a working cycle, the coefficients of representation of state of the converter are obtained in a standard manner known per se by the expert. More precisely:

For a variation on $_\Delta Td$, $_\Delta Td=\delta_{td}$ $kV(k)=0$ $V_{Cr}(k)=0$ $I_{Lp}(k)=0$ $E(k)=0$:

$$g_1 = \frac{\Delta Q(k+1)}{\delta td(k)} \quad g_2 = \frac{\Delta V_{Cr}(k+1)}{\delta td(k)} \quad g_3 = \frac{\Delta I_{Lp}(k+1)}{\delta td(k)}$$

For a variation on: KV, $\Delta Td(k)=0$ $kV(k)=\Delta KV$ $V_{Cr}(k)=0$ $I_{Lp}(k)=0$ $e(k)=0$:

$$f_{11} = \frac{\Delta Q(k+1)}{\Delta KV(k)} \quad f_{21} = \frac{\Delta V_{Cr}(k+1)}{\Delta KV(k)} \quad f_{31} = \frac{\Delta I_{Lp}(k+1)}{\Delta KV(k)}$$

For a variation on: $V_{Cr}$, $\Delta Td(k)=0$ $kV(k)=0$ $V_{Cr}(k)=\Delta V_{Cr}$ $I_{Lp}(k)=0$ $e(k)=0$:

$$f_{12} = \frac{\Delta Q(k+1)}{\Delta V_{Cr}(k)} f_{22} = \frac{\Delta V_{Cr}(k+1)}{\Delta V_{Cr}(k)} f_{32} = \frac{\Delta I_{Lp}(k+1)}{\Delta V_{Cr}(k)}$$

For a variation on: $I_{Lp}$, $\Delta Td(k)=0$ $kV(k)=0$ $V_{Cr}(k)=0$ $I_{Lp}(k)=\Delta I_{Lp}$ $e(k)=0$:

$$f_{13} = \frac{\Delta Q(k+1)}{\Delta I_{Lp}(k)} f_{23} = \frac{\Delta V_{Cr}(k+1)}{\Delta I_{Lp}(k)} f_{33} = \frac{\Delta I_{Lp}(k+1)}{\Delta I_{Lp}(k)}$$

For a variation on: E, , $\Delta Td(k)=0$ $kV(k)=0$ $V_{Cr}(k)=0$ $I_{Lp}(k)=0$ $e(k)=\Delta E/2$:

$$w_1 = \frac{\Delta Q(k+1)}{2^*\Delta\frac{E}{2}(k)} w_2 = \frac{\Delta V_{Cr}(k+1)}{2^*\Delta\frac{E}{2}(k)} w_3 = \frac{\Delta I_{Lp}(k+1)}{2^*\Delta\frac{E}{2}(k)}$$

In these formulas, ΔQ represents the variation of load in the capacitors of the output filter in the course of a cycle.

The gains K can then be obtained by several standard methods well known to the expert, such as, for example, an optimal control method.

In other words, for a working point, identification with a simulation on a single switch unfolds in two phases:

1. Stabilization around a working point making it possible to memorize steady state quantities as well as the state vector to serve for variations on the initial conditions,
2. Variation of the initial condition on each state variable, that is, simulation on a cycle after variation of one of the initial conditions and calculation of the associated gains.

Thus, for a couple (kV; I0), one obtains the values of the steady state quantities necessary for the closed loop control law (Td0, Vcr0 and ILp0), the coefficients of representation of state of the dynamic model and values of the associated gains.

In the embodiments of the invention the simulation using only one switch and inverting the variables belonging to the common part of the representation circuit at the start of each cycle makes it possible to attain without attenuation equalizer all the working points used for identification, while some are unstable in open loop.

The cartography of the working points of the generator then being stored in a memory, the adjustment of control can then be undertaken.

More precisely, the output voltage $kV_{mes}(k)$, output current $I0(k)$, current $ILp_{mes}(k)$ and voltage $VCr_{mes}(k)$ are measured at sampling time $t_k$. It is, however, to be noted that the output current $I0(k)$ can be obtained from the output voltage if the resistance of the tube is known.

The measured value of the output voltage and measured value of the output current make it possible to determine a working point. The steady state values are then deduced therefrom, as well as the associated gain values, possibly by interpolation of the tables memorized.

The desired value of output voltage $kV_{cons}(k)$ is deduced from the predetermined law of desired value. The integral corrective term IT is determined from formula (3) and the corrective term $\Delta Td(k-1)$ is determined by formula (4).

As far as the static term $Td0(k)$ is concerned, it is determined not from the working point measured, but from the working point estimated at the following sampling time, that is, from voltage and output current values estimated at the following sampling time. The estimate of the output voltage value is made from the predetermined law of desired value, knowing that the following sampling time is equal to the sum of the term Td(k−1) calculated in the preceding cycle plus time Tp which is a constant in the order of 6 or 6.5 μs.

The estimated current value can be deduced from the estimated output voltage value, using, notably, the resistance value of the tube.

Taking all these factors into account, the control value Td(k) can be calculated from formula (1) and will therefore be applied for the cycle beginning at the following sampling time $t_{k+1}$.

Figure 3:
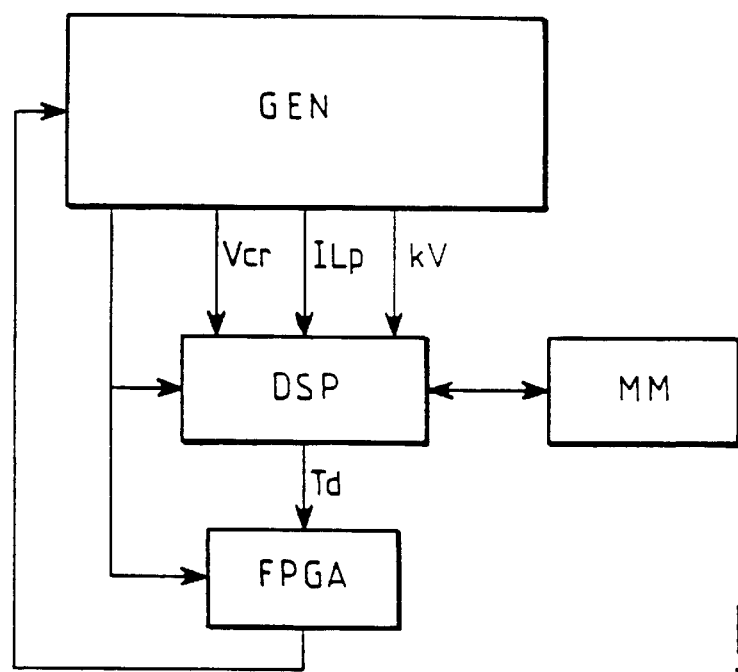
FIG. 3 illustrates very schematically a material representation of the system of control of the generator according to the invention.

Materially, the control circuit can be made (FIG. 3), for example, from a signal treatment processor DSP that receives the values Vcr, Ilp and kV and determines from the content of the memory MM the control value Td. The control value Td is delivered to a logic circuit FPGA which controls the alternate conduction of the two transistors of the generator.

Furthermore, the method makes it possible to take into account a modification of voltage E without modifying the content of the tables memorized. More precisely, if voltage E becomes equal to αE, then the output voltage usable for the determination of Td0 will be equal to kV'/α if kV' designates the output voltage corresponding to E'.

Likewise, I0 (output current) will be equal to I0'/α.

Furthermore, the desired values VCr0' and ILp0' are respectively equal to αVCr0 and αIlp0 and the new gains K' will simply be equal to gains K (corresponding to VCr0, ILp0, Td0) divided by α.

Various modifications in structure and/or steps and/or function may be made by one skilled in the art without departing from the scope of the invention.

What is claimed is:

1. A method of controlling a double-resonance generator delivering a direct-current output voltage supplying a load, in which an output current circulates, involving a delay time control of the transistors of the thyratron inverter of the generator, wherein the control involves a static term and a corrective term, a first table is elaborated, containing for predetermined couples of output voltage and output current values the corresponding values for the static term, and a second table containing corresponding desired values for a first voltage at the terminals of the resonant circuit capacitor and for the current crossing the inductance coil connected in parallel on the capacitor, as well as corresponding gain values a current sampling time the control calculated at the preceding sampling time is applied, and the control intended to be applied at the following sampling time is determined, the static term of the following control is determined from the first table and from the voltage and output current values estimated at the following sampling time, and the corrective term of the following control is determined from the second table, from the values determined at the current sampling time, from the output voltage and output current, from the first voltage and from the said inductance current, as well as from the value of the corrective term calculated at the preceding sampling time.

2. The method according to claim 1, wherein the voltage and output current values are estimated at the following sampling time from a predetermined evolution of a desired output voltage; and the determination of the corrective term of the following control involves measurement of the current value of the output voltage, of the current value of the first voltage and of the current value of the inductance current, and calculation of the sum of the products of the respective differences between those measured current values and the corresponding desired values by the associated gains, plus the product of the preceding corrective term by the associated gain.

3. The method according to claim 2, wherein the determination of the corrective term of the following control further entails addition of the product of an integral corrective element relative to the output voltage by the associated gain.

4. The method according to claim 1, wherein the elaboration of the first table as well as the elaboration of the desired values for the first voltage and inductance current is obtained by simulation from a generator representation circuit, in which simulation of the desired values are obtained in steady state by using only one transistor of the thyratron inverter and by inverting, at the beginning of each cycle, the variables belonging to the common part of said circuit, and that elaboration of the gains entails the elaboration of a dynamic model, the coefficients of which are obtained by variations of the initial conditions.

5. The method according to claim 2, wherein the elaboration of the first table as well as the elaboration of the desired values for the first voltage and inductance current is obtained by simulation from a generator representation circuit, in which simulation of the desired values are obtained in steady state by using only one transistor of the thyratron inverter and by inverting, at the beginning of each cycle, the variables belonging to the common part of said circuit, and that elaboration of the gains entails the elaboration of a dynamic model, the coefficients of which are obtained by variations of the initial conditions.

6. The method according to claim 3, wherein the elaboration of the first table as well as the elaboration of the desired values for the first voltage and inductance current is obtained by simulation from a generator representation circuit, in which simulation of the desired values are obtained in steady state by using only one transistor of the thyratron inverter and by inverting, at the beginning of each cycle, the variables belonging to the common part of said circuit, and that elaboration of the gains entails the elaboration of a dynamic model, the coefficients of which are obtained by variations of the initial conditions.

* * * * *